(12) United States Patent
Kodaira

(10) Patent No.: US 9,393,960 B2
(45) Date of Patent: Jul. 19, 2016

(54) VEHICLE CRUISE CONTROL DEVICE

(71) Applicant: Takahiro Kodaira, Machida (JP)

(72) Inventor: Takahiro Kodaira, Machida (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 14/648,147

(22) PCT Filed: Nov. 28, 2012

(86) PCT No.: PCT/JP2012/080721
§ 371 (c)(1),
(2) Date: May 28, 2015

(87) PCT Pub. No.: WO2014/083631
PCT Pub. Date: Jun. 5, 2014

(65) Prior Publication Data
US 2015/0298695 A1 Oct. 22, 2015

(51) Int. Cl.
*B60K 31/00* (2006.01)
*B60W 30/12* (2006.01)
*B60W 50/14* (2012.01)
*G05D 1/00* (2006.01)
*B60W 30/14* (2006.01)

(52) U.S. Cl.
CPC ............ *B60W 30/12* (2013.01); *B60W 50/14* (2013.01); *G05D 1/0061* (2013.01); *B60W 30/143* (2013.01)

(58) Field of Classification Search
USPC ............ 701/93, 96, 48, 36, 301, 41; 180/170; 340/901, 904; 318/433
See application file for complete search history.

(56) References Cited

U.S. PATENT DOCUMENTS

| 7,689,359 | B2 * | 3/2010 | Tokoro | B60R 21/013 340/435 |
|---|---|---|---|---|
| 9,096,229 | B2 * | 8/2015 | Eriksson | B60W 10/06 |
| 2003/0045990 | A1 * | 3/2003 | Adachi | B60K 31/0008 701/96 |
| 2007/0005218 | A1 * | 1/2007 | Ueyama | B60W 30/16 701/96 |
| 2007/0168128 | A1 * | 7/2007 | Tokoro | B60R 21/013 701/301 |
| 2012/0150411 | A1 * | 6/2012 | Oosawa | B60K 31/0008 701/96 |
| 2013/0030668 | A1 * | 1/2013 | Eriksson | B60W 10/06 701/94 |
| 2013/0030688 | A1 * | 1/2013 | Shimizu | G08G 1/161 701/301 |
| 2015/0307100 | A1 * | 10/2015 | Shimizu | B60T 7/22 701/96 |

FOREIGN PATENT DOCUMENTS

| JP | 10-76965 A | | 3/1998 | |
|---|---|---|---|---|
| WO | WO2011/002367 | * | 2/2011 | B60W 10/06 |
| WO | PCT/SE09/50862 | * | 2/2012 | B60W 10/11 |

OTHER PUBLICATIONS

Longitudinal control of intelligent vehicle based on hybrid automata model Y. Ge; Y. Chen; G. Zhang; Intelligent Control and Automation (WCICA), 2012 10th World Congress on; Year: 2012; pp. 1848-1853, DOI: 10.1109/WCICA.2012.6358177.*

* cited by examiner

*Primary Examiner* — Cuong H Nguyen
(74) *Attorney, Agent, or Firm* — Sughrue Mion, PLLC

(57) ABSTRACT

A vehicle cruise control device is provided that sets a traveling road that the vehicle is to travel from then based on acquired information of surroundings, and executes normal cruise control for causing the vehicle to travel along the set traveling road (S300), and when normally acquiring information of surroundings becomes impossible, the vehicle cruise control device executes interim cruise control for causing the vehicle to travel along the set traveling road (S500). The vehicle cruise control device estimates an interim travel time from when the interim cruise control starts until the vehicle completes the traveling along the set traveling road, sets a target deceleration variably so that, when the interim travel time is short, the target deceleration is higher as compared to where the interim travel time is long, and decelerates the vehicle so that a deceleration of the vehicle coincides with the target deceleration (S600).

6 Claims, 10 Drawing Sheets

VEHICLE CRUISE CONTROL DEVICE

CROSS REFERENCE TO RELATED APPLICATIONS

This application is a National Stage of International Application No. PCT/JP2012/080721, filed Nov. 28, 2012, the contents of all of which are incorporated herein by reference in their entirety.

TECHNICAL FIELD

The present invention relates to a vehicle cruise control device, and more specifically relates to a vehicle cruise control device that causes a vehicle to travel along a traveling road by performing automatic steering control for controlling a rudder angle of steerable wheels.

BACKGROUND ART

As a vehicle cruise control device for a vehicle such as an automobile or the like, the following are known: a traveling trajectory control device that controls cruise trajectory so as to causes a vehicle to travel along a target trajectory; and a lane keeping device that determines a lateral dislocation quantity of a vehicle with respect to a lane so as to prevent the vehicle from deviating from the lane. In these cruise control devices, automatic steering control is performed in which steerable wheels are automatically steered by a rudder angle varying device, irrespective of presence/absence of a steering operation by a driver.

In automatic steering control by the cruise control device, information about a situation in front of the vehicle is acquired by an image pickup device such as a CCD camera, a traveling road that the vehicle is to travel along is set based on the acquired image information, and a rudder angle of steerable wheels are controlled so that the vehicle travels along the traveling road thus set. In this case, the setting of a traveling road is executed by electronically processing the acquired image information and determining boundaries of a traveling road such as white lines, guardrails, medians, road shoulders and the like.

In some cases, an image pickup device becomes unable to acquire information about a preliminarily set distance range depending on a driving situation of a vehicle, for example, low visibility caused by fog, disorders of an image pickup device, etc. In such a situation, appropriate cruise control cannot be performed. Therefore, as is described in, for example, JP10(1998)-76965A, an alarm is issued that indicates the stopping of cruise control, cruise control is stopped, and the steering mode shifts from an automatic steering mode to a manual steering mode.

Further, the following is known as well: as is described in, for example, JP2001-22444A, when an image pickup device becomes temporarily unable to appropriately acquire information about a situation in front of the vehicle and cruise control has to be stopped, the vehicle is decelerated so that cruise control should not be stopped and started repeatedly.

SUMMARY OF INVENTION

Technical Problem

In a cruise control device, as is described in, for example, JP10(1998)-76965A mentioned above, when cruise control is stopped without deceleration of a vehicle, the driver is unable to respond to shift from the automatic steering mode to the manual steering mode.

Further, the following means may be proposed: the vehicle may be decelerated, not for preventing cruise control being stopped and started repeatedly as is described in JP2001-22444A mentioned above, but for allowing the driver to easily respond to shift of the steering mode when cruise control is stopped. In the case where, however, the degree of deceleration of the vehicle is set higher so that the driver is allowed to easily respond to shift of the steering mode, an occupant of the vehicle tends to easily feel discomfort caused by the deceleration. By contraries, in the case where the degree of deceleration of the vehicle is set lower so that an occupant of the vehicle hardly feels discomfort, the decrease of the vehicle speed is insufficient, which not only causes the driver unable to respond to shift of the steering mode well, but also increases a risk that a sharp change would occur in the traveling behavior of the vehicle when the steering mode shifts.

Further, the following may be proposed also: even when an image pickup device becomes unable to appropriately acquire information about a situation in front of the vehicle, interim cruise control is continued for a while based on information that has been acquired by that time, and at the same time, the vehicle is decelerated. In the case where, however, the degree of deceleration of the vehicle is set lower, when the distance for which the vehicle travels during the interim cruise control is short or when the vehicle speed is high, the decrease of the vehicle speed is insufficient and the duration time of the interim cruise control is short, which makes the driver unable to respond well to the shift of the steering mode. By contraries, in the case where the degree of deceleration of the vehicle is set higher, the vehicle speed decreases fast. Therefore, in the case where the distance for which a vehicle travels during interim cruise control is long or the vehicle speed is low, the duration time of interim cruise control tends to be too long.

The present invention is made in light of the above-described problem in a conventional cruise control device. The principal object of the present invention is to adjust a duration time of interim cruise control to an appropriate length, so as to allow a driver to excellently respond to the shift of the steering mode, while suppressing discomfort caused by a decrease in the speed and abrupt changes in the traveling behavior of a vehicle.

Solution to Problem and Advantageous Effects of Invention

According to the present invention, the above-described principal object is achieved by a vehicle cruise control device that acquires information of surroundings of a vehicle, sets a traveling road that the vehicle is to travel from then based on the acquired information of the surroundings, and executes cruise control for causing the vehicle to travel along the set traveling road, wherein when normally acquiring information of surroundings becomes impossible, the vehicle cruise control device executes interim cruise control for causing the vehicle to travel along the set traveling road, while causing a vehicle speed to decrease. The vehicle cruise control device estimates an interim travel time from when the interim cruise control starts until the vehicle completes the traveling along the set traveling road; sets a target deceleration variably according to the interim travel time so that, when the interim travel time is short, the target deceleration is higher as compared to where the interim travel time is long; and decelerates the vehicle so that a deceleration of the vehicle coincides with the target deceleration.

According to the above-described configuration, an interim travel time from when the interim cruise control starts until the vehicle completes the traveling along the set traveling road is estimated. Then, a target deceleration is set variable according to the interim travel time so that, when the interim travel time is short, the target deceleration is higher as compared to where the interim travel time is long Therefore, in the case where the distance of the set traveling road is short or the case where the vehicle speed is high, it is possible that the deceleration of the vehicle can be increased, whereby a duration time of the interim cruise control is prevented from becoming excessively short, and this allows the driver to excellently respond to the shifting of the steering mode. Further, a risk can be reduced that the traveling behavior of the vehicle would suddenly change when interim cruise control ends and the mode of steering by a driver starts in a situation of a high vehicle speed. By contraries, in the case where the distance of the set traveling road is long or the case where the vehicle speed is low, the target deceleration is set low, and this makes it possible to prevent excessive decrease of the vehicle speed that would lead to excessive increase of the duration time of interim cruise control. Further, a risk can be reduced that an occupant of the vehicle would feel discomfort caused by a high deceleration of the vehicle.

Further, the above-described configuration may be configured so that, using the vehicle speed upon start of the interim cruise control as a criteria vehicle speed, the cruise control device sets the target deceleration variably according to the criteria vehicle speed in such a manner that, when the criteria vehicle speed is high, the target deceleration is lower as compared to where the criteria vehicle speed is low.

Generally, discomfort that an occupant of a vehicle feels due to automatic deceleration of the vehicle is more remarkable in a situation where the vehicle speed is high, as compared with a situation where the vehicle speed is low. According to the above-described configuration, when the criteria vehicle speed is high, the deceleration is lower as compared to where the criteria vehicle speed is low. Therefore, in a situation where the distance of the set traveling road is short and the criteria vehicle speed is low, the deceleration of the vehicle can be prevented from unnecessarily decreasing; and in a situation where the distance of the set traveling road is long and the criteria vehicle speed is high, a risk that an occupant would feel discomfort can be effectively reduced.

It should be noted that the discomfort that an occupant of a vehicle feels due to automatic deceleration of the vehicle is more negligible as a rate of increase of the target deceleration upon start of interim cruise control is lower. Therefore, the rate of increase of the target deceleration upon start of interim cruise control may be set variable according to the criteria vehicle speed so that the rate of increase of the target deceleration is lower when the criteria vehicle speed is high, as compared to where the criteria vehicle speed is low.

Further, in the above-described configuration, the cruise control device may be configured so as to include a rudder angle varying device configured to change a rudder angle of a wheel, wherein the cruise control device executes the cruise control and the interim cruise control by calculating a target state quantity of the vehicle for causing the vehicle to travel along the set traveling road, calculating a target rudder angle of the wheel based on the target state quantity, and controlling the rudder angle varying device in such a manner that the rudder angle of the wheel coincides with the target rudder angle, and wherein the cruise control device sets a gain of the target rudder angle of the wheel with respect to the target state quantity variably according to the vehicle speed during the cruise control, and does not sets the gain variably according to the vehicle speed during the interim cruise control.

According to the above-described configuration, a gain of the target rudder angle of the wheel with respect to the target state quantity varies according to the vehicle speed during the cruise control, and does not vary according to the vehicle speed during the interim cruise control. Therefore, the rudder angle of the wheels can be controlled according to a gain corresponding to the vehicle speed during cruise control. At the same time, during interim cruise control, a risk can be reduced that the decrease of the vehicle speed caused by deceleration control would cause the gain to change and this would cause the traveling behavior of the vehicle to deteriorate.

Further, the above-described configuration may be configured so that when the vehicle completes the traveling along the set traveling road, the cruise control device ends the interim cruise control and the deceleration of the vehicle.

According to the above-described configuration, unnecessary continuation of the deceleration of the vehicle in spite of the end of interim cruise control, which would lead to unnecessary decrease of the vehicle speed, can be prevented surely.

Further, the above-described configuration may be configured so that when any one of a steering operation, a deceleration operation, and an accelerate operation is executed by the driver during the execution of the interim cruise control, the cruise control device ends the interim cruise control and the deceleration of the vehicle.

According to the above-described configuration, when any one of a steering operation, a deceleration operation, and an accelerate operation is executed by the driver, the interim cruise control and the deceleration of the vehicle are ended. Therefore, even though interim cruise control is executed, the driver can end the interim cruise control and shifts the steering mode to the manual steering mode by executing any one of a steering operation, a deceleration operation, and an accelerate operation, and further, the driver can end the deceleration of the vehicle. In other words, priority can be placed to the driver's intention to drive, rather than interim cruise control.

Further, the above-described configuration may be configured so that when normally acquiring information of surroundings of the vehicle becomes possible during the interim cruise control, the cruise control device ends the interim cruise control and the deceleration of the vehicle, and resumes the cruise control.

According to the above-described configuration, when normally acquiring information of surroundings of the vehicle becomes possible during the interim cruise control, the interim cruise control and the deceleration of the vehicle are ended, and the cruise control is resumed. Therefore, it is possible to surely prevent interim cruise control and decrease of the vehicle speed from unnecessarily continuing in spite that normally acquiring information of surroundings of the vehicle has become possible, and to surely resume the cruise control.

According to one preferable aspect of the present invention, the configuration may be such that, using the vehicle speed upon start of the interim cruise control as a criteria vehicle speed, the cruise control device estimates an interim travel time by dividing the distance of the set traveling road by the criteria vehicle speed.

According to another preferable aspect of the present invention, the configuration may be such that the cruise control device sets a rate of increase of the target deceleration upon start of the interim cruise control variably according to the criteria vehicle speed in such a manner that, when the criteria vehicle speed is high, the rate of increase of the target deceleration is lower as compared to where the criteria vehicle speed is low.

According to still another preferable aspect of the present invention, the configuration may be such that a target state quantity of the vehicle for causing the vehicle to travel along the set traveling road is any one of a target lateral acceleration degree of the vehicle, a target yaw rate of the vehicle, a target yaw moment of the vehicle, and a target lateral force of the vehicle.

According to still another preferable aspect of the present invention, the configuration may be such that during cruise control, a gain of the target rudder angle of the wheels with respect to a target state quantity is set variable so as to change toward such a side as to accelerate the turning of the vehicle as the vehicle speed is lower.

According to still another preferable aspect of the present invention, the configuration may be such that when a steering operation is executed by the driver, the cruise control device simultaneously ends the interim cruise control and the deceleration of the vehicle, whereas when a deceleration operation or an accelerate operation is executed by the driver, the cruise control device ends the deceleration of the vehicle and thereafter ends the interim cruise control.

BRIEF DESCRIPTION OF DRAWINGS

FIG. 10 is a map for calculating a steady gain Ksr for a target rudder angle δlkar of rear wheels based on a vehicle speed V.

DESCRIPTION OF EMBODIMENT

The following explains a preferable embodiment of the present invention in detail while referring to attached drawings.

Figure 1:
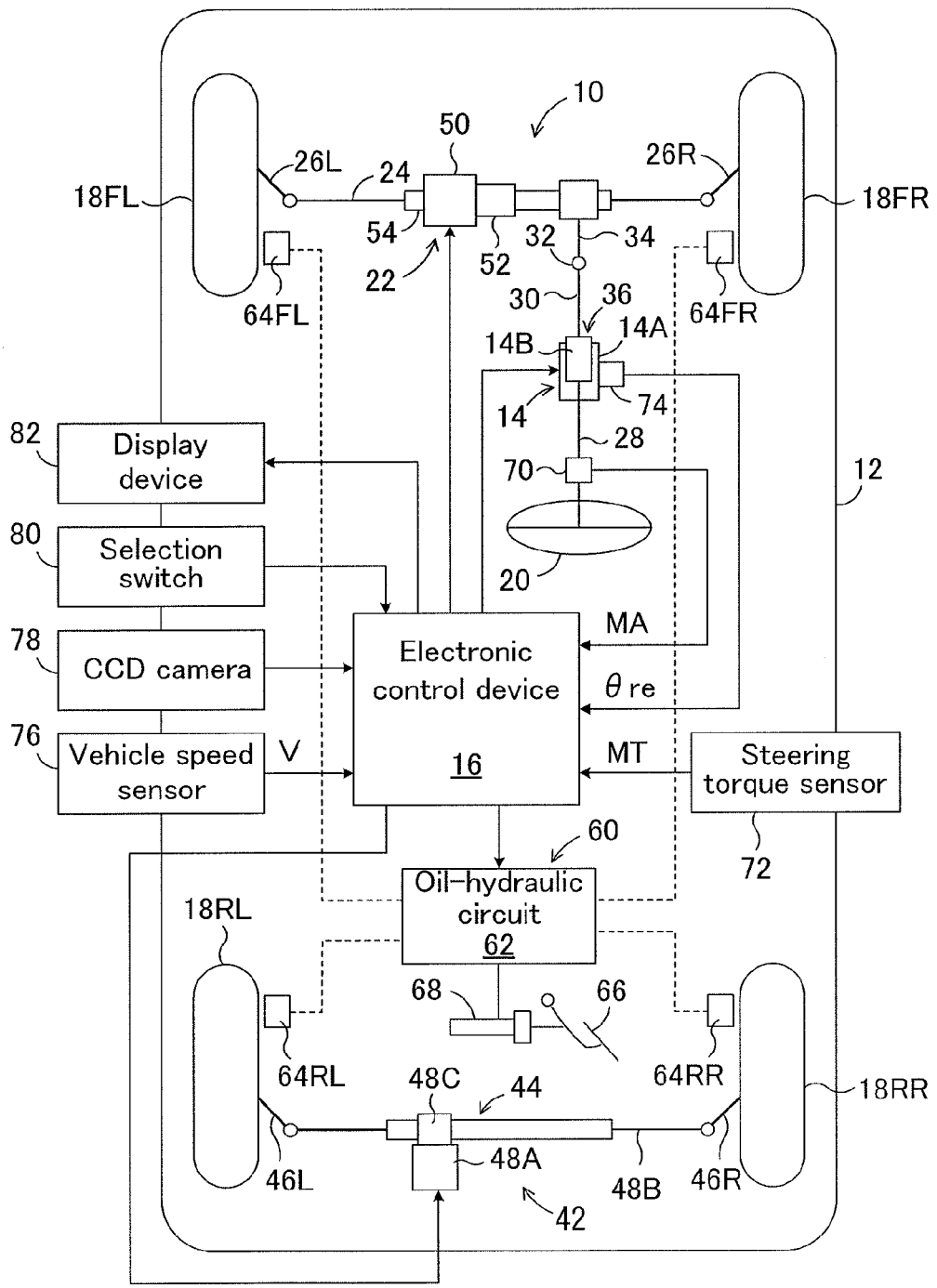
FIG. 1 illustrates a schematic configuration of one embodiment of a vehicle cruise control device according to the present invention applied to a vehicle on which a rudder angle varying device for front wheels and a rear wheel steering device are mounted.

FIG. 1 illustrates a schematic configuration of one embodiment of a vehicle cruise control device according to the present invention applied to a vehicle on which a rudder angle varying device for front wheels and a rear wheel steering device are mounted.

In FIG. 1, a cruise control device 10 according to the present invention is mounted on a vehicle 12, and includes a rudder angle varying device 14 and an electronic control device 16 for controlling the same. Further, in FIG. 1, "18FL" and "18FR" indicate left and right front wheels of the vehicle 12, respectively, and "18RL" and "18RR" indicate left and right rear wheels of the same, respectively. The left and right front wheels 18FL and 18FR, which are steerable wheels, are turned by a rack-and-pinion-type electric power steering device 22 driven in response to an operation of a steering wheel 20 by a driver, via a rack bar 24 and tie rods 26L and 26R.

The steering wheel 20 as a steering input device is connected to, and driven by, a pinion shaft 34 of the power steering device 22 via an upper steering shaft 28, the rudder angle varying device 14, a lower steering shaft 30, and a universal joint 32. The rudder angle varying device 14 includes a motor 36 for auxiliary turning drive that is linked to a lower end of the upper steering shaft 28 on a housing 14A side, and linked to an upper end of the lower steering shaft 32 on a rotor 14B side via a deceleration mechanism that is not illustrated in the drawing.

Thus, the rudder angle varying device 14 rotates and drives the lower steering shaft 30 relatively with respect to the upper steering shaft 28, thereby performing auxiliary turning drive of the left and right front wheels 18FL and 18FR relatively with respect to the steering wheel 20. Thus, the rudder angle varying device 14 functions as a variable gear ratio steering device (VGRS) for increasing/decreasing the steering gear ratio (a reciprocal of a steering transmission ratio). Besides, the rudder angle varying device 14 also functions as a front-wheel rudder angle varying device for changing the relationship between the rotation position of the steering wheel 20 and the rudder angle of the front wheels by changing the rudder angle of the left and right front wheels, irrespective of presence/absence of a steering operation by the driver. As is described in detail below, the rudder angle varying device 14 is controlled by a rudder angle control unit of the electronic control device 16.

The left and right rear wheels 18RL and 18RR are steered by an electric power steering device 44 of a rear wheel steering device 42 via tie rods 46L and 46R, independently of the steering of the left and right front wheels 18FL and 18FR. The rear wheel steering device 42, therefore, functions as a rear-wheel rudder angle varying device for changing the rudder angle of the left and right rear wheels independently of a steering operation by the driver, and is controlled by the rudder angle control unit of the electronic control device 16, as is described below.

The rear wheel steering device 42 illustrated in the drawing is an electric auxiliary steering device having a known configuration, and includes a motor 48A, and a movement conversion mechanism 48C for converting the rotation of the motor 48A into a reciprocal movement of a relay rod 48B, which is, for example, a screw-type movement conversion mechanism. The relay rod 48B composes a turning mechanism that turns and drives the left and right rear wheels 18RL and 18RR in cooperation with the tie rods 46L, 46R and a knuckle arm (not illustrated in the drawings), using the reciprocal movement of the relay rod 48B.

Though not illustrated in the drawings in detail, the conversion mechanism 48C is configured in the following manner: the conversion mechanism 48C converts the rotation of the motor 48A into a reciprocal movement of the relay rod 48B, but does not transmit, to the motor 48A, a force received by the left and right rear wheels 18RL and 18RR from a road surface and thus transmitted to the relay rod 48B, so that the motor 48A should not be rotated and driven by a force transmitted to the relay rod 48B.

In the embodiment illustrated in the drawings, the electric power steering device 22 is a rack-coaxial-type electric power steering device, and includes a motor 50, and a conversion mechanism 52 that converts a rotation torque of the motor 50 into a force in the direction of the reciprocating movement of the rack bar 24, for example, a ball-screw-type conversion mechanism. The electric power steering device 22 is controlled by an electric power steering device (EPS) control unit of the electronic control device 16. The electric power steering device 22 functions as a steering assist force generation device that generates an auxiliary steering force for driving the rack bar 24 relatively with respect to the housing 54, so as to reduce steering loads on the driver and assist the operation of the rudder angle varying device 14.

It should be noted that the rudder angle varying device 14 and the rear wheel steering device 42 may have any arbitrary configurations as long as they are capable of changing the rudder angle of the front wheels and the rudder angle of the rear wheels, respectively, independently of a steering operation by the driver. Further, the steering assist force generation device may have any arbitrary configuration as long as the same is capable of generating an auxiliary steering force. Still further, though the steering input device is the steering wheel 20 herein, the same may be a joystick-type steering lever.

The braking forces for the wheels are controlled by controlling pressures in wheel cylinders 64FL, 64FR, 64RL, and 64RR by an oil-hydraulic circuit 62 of a braking device 60, that is, by controlling brake pressures, respectively. Though not illustrated in FIG. 1, the oil-hydraulic circuit 62 includes an oil reservoir, an oil pump, a variety of valve devices and the like, and during normal driving, the brake pressure of each wheel cylinder is controlled by a master cylinder 68 that is driven in response to an operation by the driver of stepping on the brake pedal 66. Further, the brake pressure of each wheel cylinder is individually controlled by the oil-hydraulic circuit 62 controlled by the braking force control unit of the electronic control device 16 as required. In this way, the braking device 60 is capable of individually controlling the braking force of each wheel, irrelevantly to the driver's braking operation.

In the embodiment illustrated in the drawings, the upper steering shaft 28 is provided with a steering angle sensor 70 that detects a rotation angle of the upper steering shaft as a steering angle MA. The pinion shaft 34 is provided with a steering torque sensor 72 that detects a steering torque MT. The rudder angle varying device 14 is provided with a rotation angle sensor 74 that detects a relative rotation angle $\theta re$, that is, a relative rotation angle of the lower steering shaft 30 with respect to the upper steering shaft 28.

A signal indicating the steering angle MA, a signal indicating the steering torque MT, and a signal indicating the relative rotation angle $\theta re$, together with a signal indicating a vehicle speed V detected by a vehicle speed sensor 76, are fed to the rudder angle control unit and the EPS control unit of the electronic control device 16. It should be noted that a rotation angle of the lower steering shaft 30 may be detected, and the relative rotation angle $\theta re$ may be obtained as a difference between the steering angle $\theta$ and the rotation angle of the lower steering shaft 30.

Further, the vehicle 12 is provided with a CCD camera 78 for picking up a forward image of the vehicle and a selection switch 80 that is to be operated by an occupant of the vehicle for selecting whether trajectory control (also referred to as "LKA (lane keeping assist) control") for causing the vehicle to travel along a traveling road should be executed. A signal indicating information of a forward image of the vehicle picked up by the CCD camera 78 and a signal indicating the position of the selection switch 80 are fed to a cruise control unit of the electronic control device 16. Forward image information of the vehicle and information about a traveling road may be acquired by a means other than a CCD camera. Further, information about the surroundings of the vehicle for execution of trajectory control may contain, in addition to information about a situation in front of the vehicle, information other than the same such as information about a situation on a side of the vehicle.

Each of the above-described control units of the electronic control device 16 may include a CPU, a ROM, a RAM, and an input/output port device, and these may include microcomputers that are connected with one another by bidirectional common buses. Further, the steering angle sensor 70, the steering torque sensor 72, and the rotation angle sensor 74 detect a steering angle MA, a steering torque MT, and a relative rotation angle $\theta re$, respectively, which have positive values in the case where the vehicle is steered or turned in the left turn direction.

As is described in detail below, the electronic control device 16 controls the rudder angle varying device 14 according to the flowcharts illustrated in FIG. 2 and the like when the selection switch 80 is ON, so as to perform normal trajectory control or interim trajectory control thereby causing the vehicle to travel along a traveling road. In normal trajectory control and interim trajectory control, the front and rear wheels are steered in automatic steering mode by the rudder angle varying device 14 and the like, independently of a steering operation by the driver.

Figure 3:
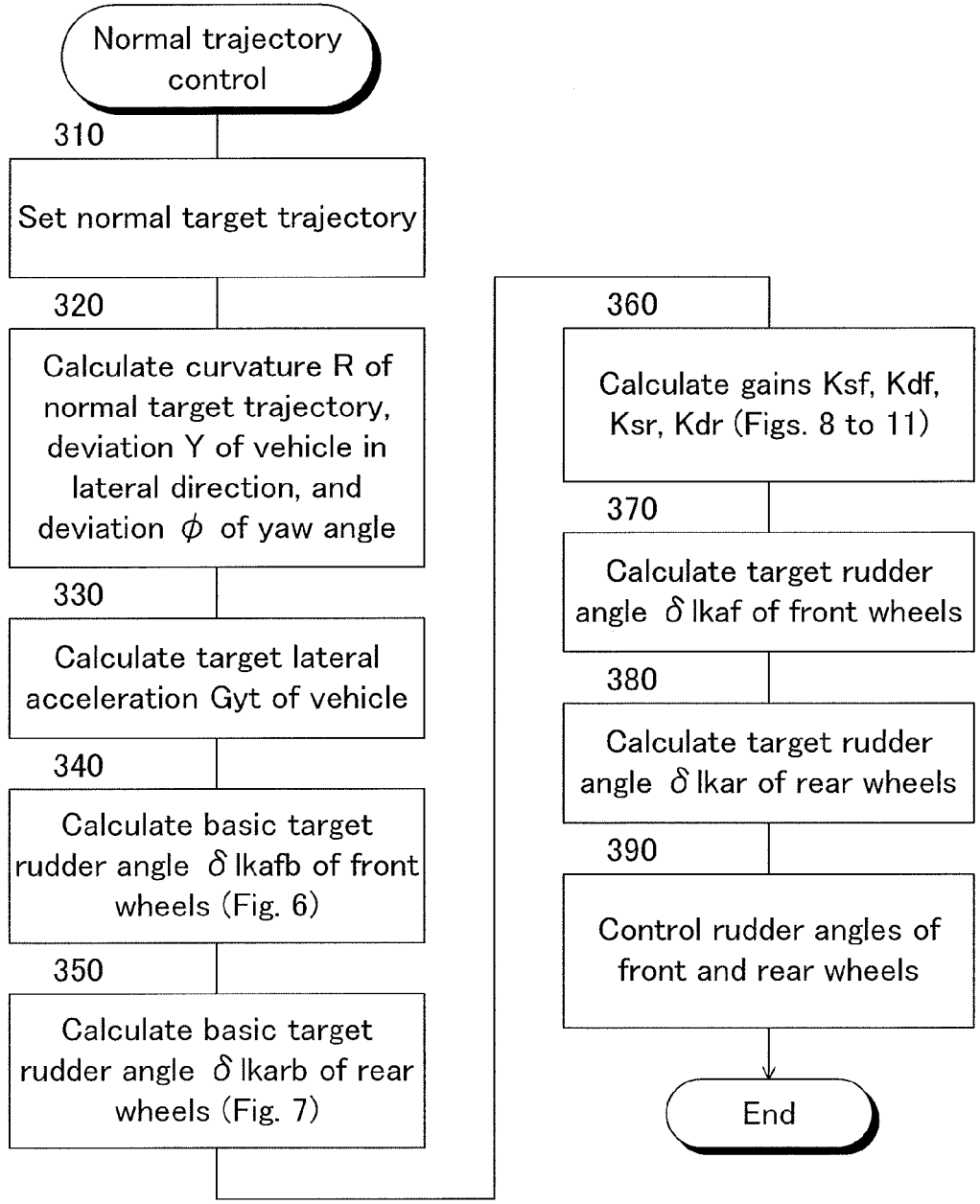
FIG. 3 is a flowchart illustrating a normal trajectory control routine executed in step 300 illustrated in FIG. 2.

In particular, when it is possible to normally acquire information about a situation in front of the vehicle by picking an image of a situation in front of the vehicle with use of the CCD camera 78, the electronic control device 16 executes normal trajectory control according to the flowchart illustrated in FIG. 3. In other words, the electronic control device 16 sets a traveling road to be traveled from then on by analysis of the image information thus acquired, sets a target trajectory along which the vehicle is to travel, and controls the rudder angles of the front and rear wheels so that the vehicle travels along the target trajectory.

Figure 4:
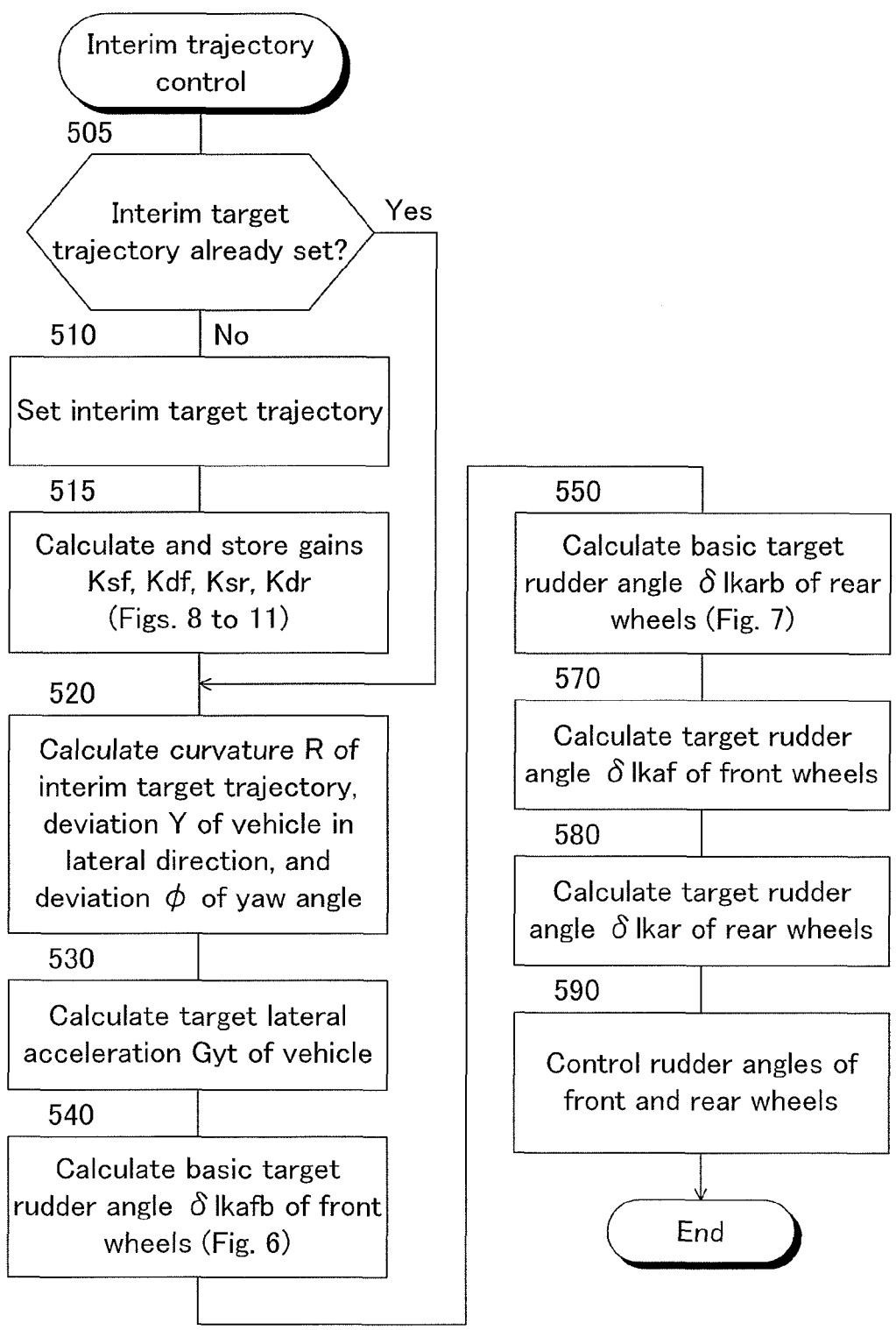
FIG. 4 is a flowchart illustrating an interim trajectory control routine executed in step 500 illustrated in FIG. 2.

In contrast, when it is impossible to normally acquire information about a situation in front of the vehicle by picking an image of a situation in front of the vehicle with use of the CCD camera 78, the electronic control device 16 executes interim trajectory control according to the flowchart illustrated in FIG. 4. In other words, the electronic control device 16 controls the rudder angles of the front and rear wheels so that the vehicle travels along an interim target trajectory, using, as the interim target trajectory, the target trajectory for causing the vehicle to travel along the traveling road set during normal trajectory control.

Figure 5:
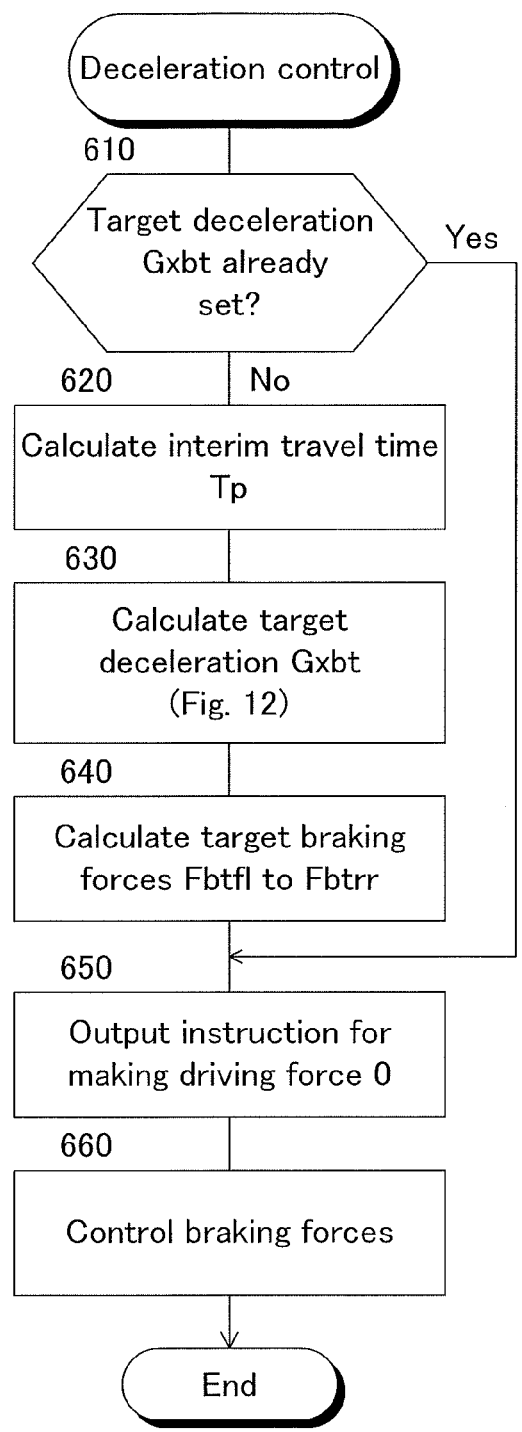
FIG. 5 is a flowchart illustrating a vehicle braking control routine executed in step 600 illustrated in FIG. 2.

Further, when executing interim trajectory control, the electronic control device 16 executes deceleration control for decelerating the vehicle according to the flowchart illustrated in FIG. 5, thereby decreasing the vehicle speed. When ending interim trajectory control, the electronic control device 16 ends deceleration control, and at the same time, shifts the steering mode from the automatic steering mode to the manual steering mode. In contrast, when returning to normal trajectory control becomes possible, the electronic control device 16 ends interim trajectory control as well as deceleration control, and at the same time, returns cruise control to normal trajectory control.

Further, the electronic control device 16 controls the electric power steering device 22 based on a steering torque MT and the like so as to reduce steering loads on the driver, and at the same time, assists the rudder angle varying device 14 in controlling the rudder angles of the left and right front wheels so that the rudder angles of the same coincide with the target rudder angles in normal trajectory control or interim trajectory control.

<Cruise Control Routine>

Figure 2:
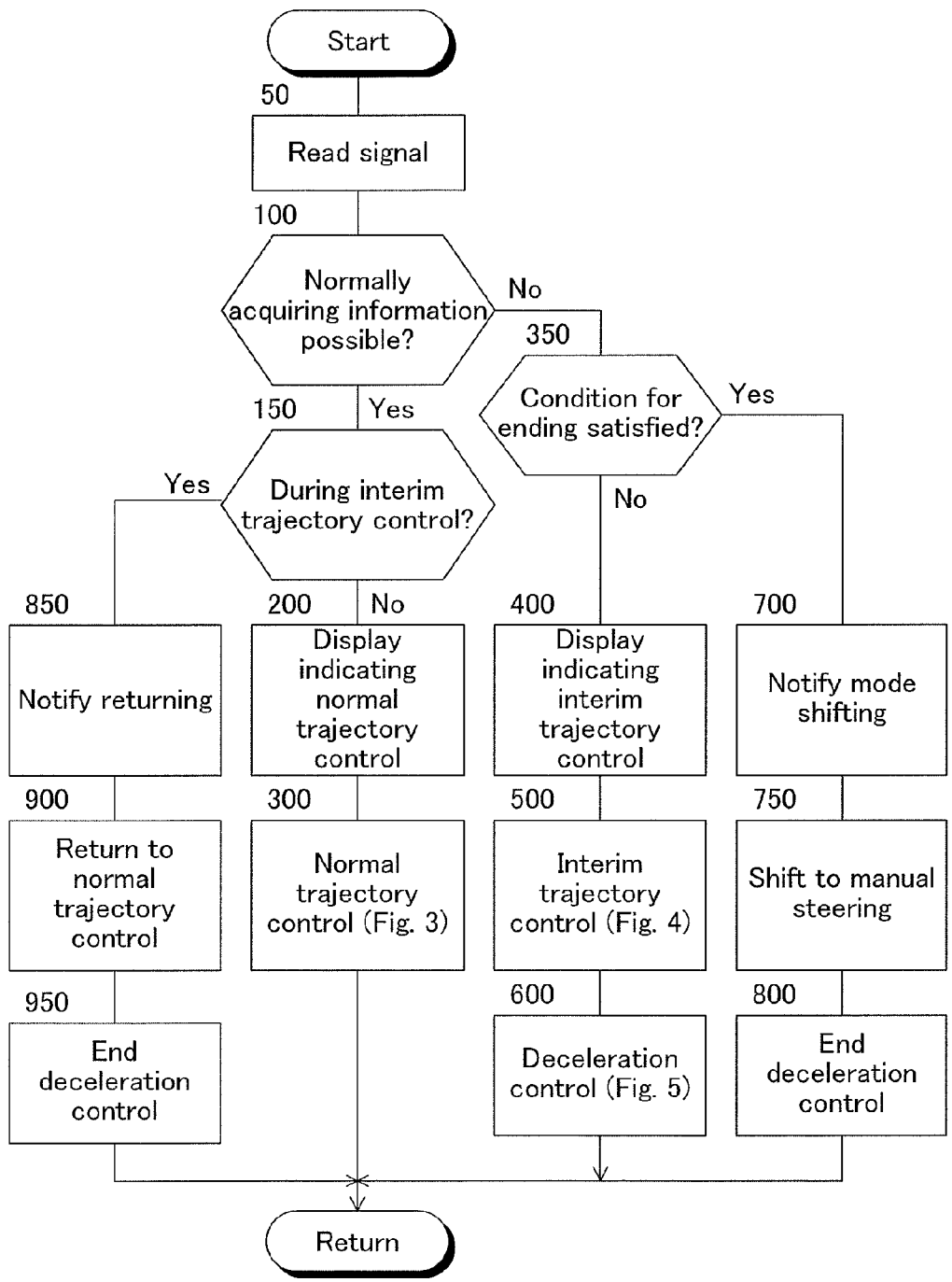
FIG. 2 is a flowchart illustrating a cruise control routine in the embodiment.

Next, the following describes a cruise control routine in the embodiment, while referring to the flowchart illustrated in FIG. 2. It should be noted that the control according to the flowchart illustrated in FIG. 2 is started when the selection switch 80 is switched from OFF to ON, and is repeatedly executed every predetermined time.

First, in step 50, a signal indicating the steering angle MA detected by the steering angle sensor 70, and the like, are read in.

In step 100, it is determined whether vehicle forward information can be normally acquired by picking up an image of a situation in front of the vehicle with use of the CCD camera 78. When the result of the determination is negative, the control proceeds to step 350, and when the result of the determination is affirmative, the control proceeds to step 150.

In step 150, it is determined whether it is during interim trajectory control. When the result of the determination is affirmative, the control proceeds to step 850, and when the result of the determination is negative, the control proceeds to step 200.

In step 200, a display indicating that normal trajectory control is being executed is displayed on the display device 82 illustrated in FIG. 1, or such display is continued.

In step 300, normal trajectory control is executed according to the flowchart illustrated in FIG. 3 as is described below, whereby the rudder angles of the front and rear wheels are controlled so that the vehicle travels along the target trajectory.

In step 350, it is determined whether conditions for ending interim trajectory control are satisfied. When the result of the determination is affirmative, the control proceeds to step 700, and when the result of the determination is negative, the control proceeds to step 400.

In this case, when any of the following is determined to have occurred, it may be determined that the conditions for ending trajectory control are satisfied.

a1: Traveling along the interim target trajectory set in step 500, which is described below, is completed.

a2: At least one of a steering operation, a deceleration operation, and an accelerate operation is executed by the driver.

In step 400, a display indicating that interim trajectory control is being executed is displayed on the display device 82, or such display is continued.

In step 500, interim trajectory control is executed according to the flowchart illustrated in FIG. 4 as is described below, whereby the rudder angles of the front and rear wheels are controlled so that the vehicle travels along the interim target trajectory.

In step 600, vehicle deceleration control is executed according to the flowchart illustrated in FIG. 5 as is described below, whereby an output of an engine (not illustrated in the drawings) is controlled so as to be 0, and at the same time, the braking force for the wheels is controlled so that a vehicle deceleration speed coincides with a target deceleration.

In step 700, visual and/or audio notification information indicating that interim trajectory control ends and the steering mode shifts from the automatic steering mode to the manual steering mode is presented by the display device 82 to the occupant of the vehicle.

In step 750, interim trajectory control is ended, whereby the steering mode shifts from the automatic steering mode to the manual steering mode.

In step 800, the target deceleration of the vehicle is gradually decreased to 0, whereby vehicle deceleration control based on the target deceleration is ended, and the vehicle speed stops decreasing.

In step 850, visual and/or audio notification information indicating that interim trajectory control ends and trajectory control returns to normal trajectory control is presented by the display device 82 to the occupant of the vehicle.

In step 900, interim trajectory control is ended, whereby trajectory control returns to normal trajectory control.

In step 950, as is the case with step 800, vehicle deceleration control based on the target deceleration is ended, whereby the vehicle speed stops decreasing.

<Normal Trajectory Control Routine>

In step 310 in a normal trajectory control routine illustrated in FIG. 3, a traveling road along which the vehicle is to travel from then on is set by analysis of information of a forward image of the vehicle picked up by the CCD camera 78, and the like, and at the same time, a normal target trajectory along the traveling road is set. It should be noted that the setting of the target trajectory of the vehicle may be based on combination of analysis of image information and information from a navigation device (not illustrated in the drawings).

In step 320, a curvature R (reciprocal of radius) of the normal target trajectory, a deviation Y of the vehicle in the lateral direction with respect to the target trajectory, and a deviation φ of a yaw angle are calculated. It should be noted that the curvature R and the like of the target trajectory are parameters necessary for executing trajectory control for causing a vehicle to travel along a normal target trajectory, but since the calculations of the same are not the essence of the present invention, these parameters may be calculated in arbitrary manners. This applies to a curvature R and the like of an interim target trajectory, which is described below.

In step 330, a target lateral acceleration Gyt is calculated as a target state quantity of the vehicle necessary for causing the vehicle to travel along the normal target trajectory, based on the parameters for the trajectory control. It should be noted that the target lateral acceleration Gyt may be calculated by a function of the parameters for the trajectory control. Alternatively, a map that indicates the relationship between the parameters for the trajectory control and the target lateral acceleration Gyt may be set, and the target lateral acceleration Gyt may be calculated according to the map based on the parameters for the trajectory control. This applies to the case of a target lateral acceleration Gyt of a vehicle based on the curvature R and the like of an interim target trajectory, which is described below.

Figure 6:
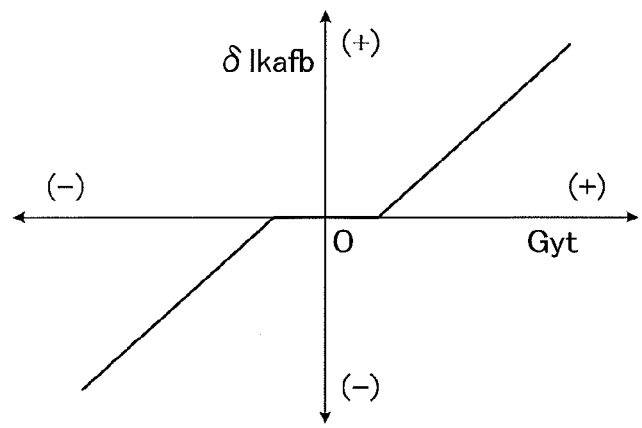
FIG. 6 is a map for calculating a basic target rudder angle θlkafb of front wheels for normal trajectory control based on a target lateral acceleration Gyt of a vehicle.

In step 340, a basic target rudder angle δlkafb of the front wheels for normal trajectory control is calculated based on the target lateral acceleration Gyt of the vehicle according to a map illustrated in FIG. 6.

Figure 7:
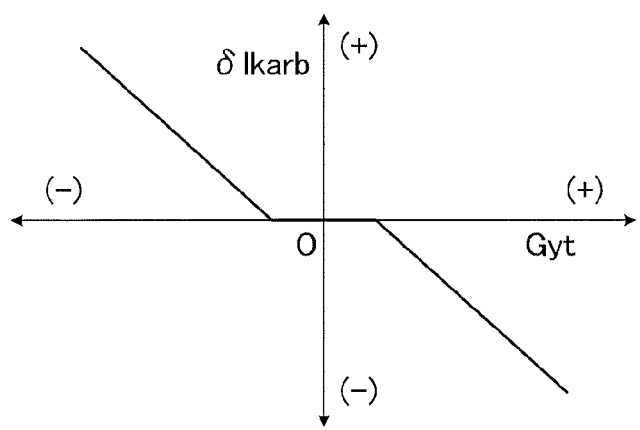
FIG. 7 is a map for calculating a basic target rudder angle θlkarb of rear wheels for normal trajectory control based on a target lateral acceleration Gyt of a vehicle.

In step 350, a basic target rudder angle δlkarb of the rear wheels for normal trajectory control is calculated based on the target lateral acceleration Gyt of the vehicle according to a map illustrated in FIG. 7.

Figure 8:
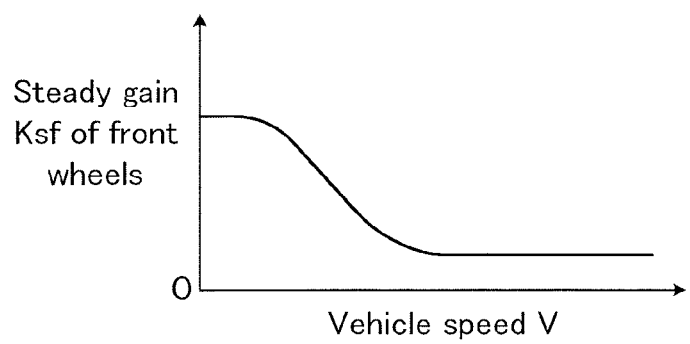
FIG. 8 is a map for calculating a steady gain Ksf for a target rudder angle δlkaf of front wheels based on a vehicle speed V.
Figure 9:
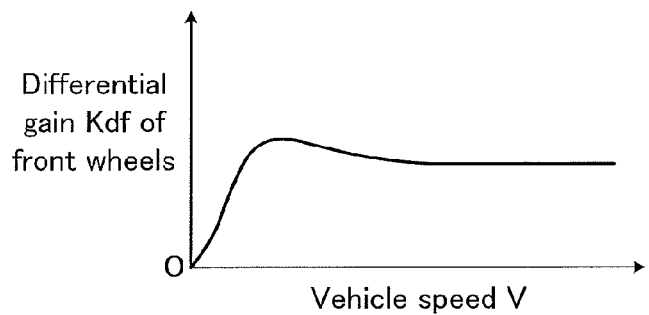
FIG. 9 is a map for calculating a differential gain Kdf for a target rudder angle δlkaf of front wheels based on a vehicle speed V.

In step 360, a steady gain Ksf and a differential gain Kdf for the target rudder angle δlkaf of the front wheels are calculated based on the vehicle speed V according to a map illustrated in FIG. 8 and a map illustrated in FIG. 9, respectively. Further, a steady gain Ksr and a differential gain Kdr for the target rudder angle δlkar of the rear wheels are calculated based on the vehicle speed V according to a map illustrated in FIG. 10 and a map illustrated in FIG. 11, respectively.

Figure 10:
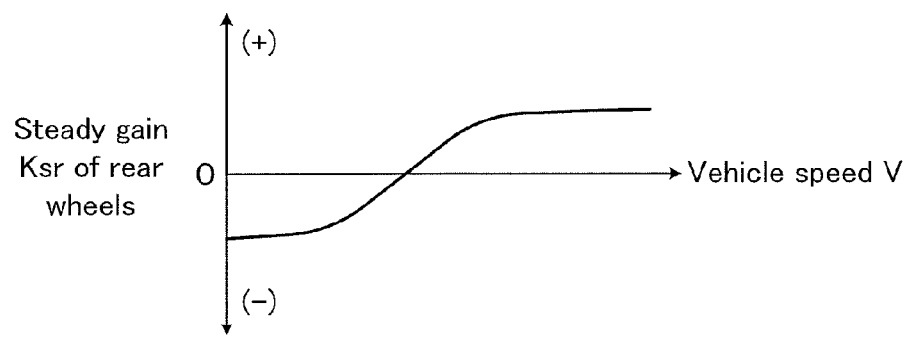
[FIG. 10]
Figure 11:
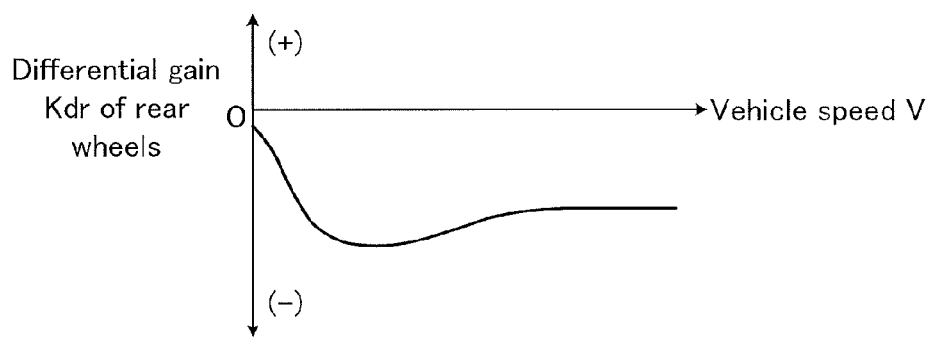
FIG. 11 is a map for calculating a differential gain Kdr for a target rudder angle δlkar of rear wheels based on a vehicle speed V.

As illustrated in FIG. 8, the steady gain Ksf for the target rudder angle δlkaf of the front wheels is calculated so as to be larger as the vehicle speed V is lower. Further, as illustrated in FIG. 10, the steady gain Ksr for the target rudder angle δlkar of the rear wheels is calculated so as to have a lower degree of being inphase with respect to the front wheels as the vehicle speed V is lower in a medium to high speed range, and so as to have a higher degree of being antiphase with respect to the front wheels as the vehicle speed V is lower in a low speed range. Therefore, the gains of the rudder angle of the front and rear wheels with respect to the target lateral acceleration Gyt in normal trajectory control are set variable according to the vehicle speed V so as to be higher to such a side as to accelerate the turning of the vehicle as the vehicle speed V is lower.

In step 370, a time differentiated value δlkafbd of the basic target rudder angle δlkafb of the front wheels is calculated, and at the same time, a target rudder angle δlkaf of the front wheels is calculated according to the expression (1) below.

$$\delta lkaf = Ksf\delta lkafb + Kdf\delta lkafbd \quad (1)$$

In step 380, a time differentiated value δlkarbd of the basic target rudder angle δlkarb of the rear wheels is calculated, and at the same time, a target rudder angle δlkar of the rear wheels is calculated according to the expression (2) below.

$$\delta lkar = Ksf\delta lkarb + Kdr\delta lkarbd \quad (2)$$

In step 390, the rudder angle varying device 14 is controlled in such a manner that the rudder angle δf of the left and right front wheels 18FL and 18FR coincides with the target rudder angle δlkaf. Further, the rear wheel steering device 42 is controlled in such a manner that rudder angle δr of the left and right rear wheels 18RL and 18RR coincides with the target rudder angle δlkar.

<Interim Trajectory Control Routine>

In step 505 of an interim trajectory control routine illustrated in FIG. 4, it is determined whether an interim target trajectory is set based on the traveling road set immediately before a negative determination is made in step 100. Then, when the result of the determination is affirmative, the control proceeds to step 520, and when the result of the determination is negative, the control proceeds to step 510.

In step 510, an interim target trajectory is set based on the traveling road set immediately before a negative determination is made in step 100. It should be noted that the interim target trajectory may be set based on a normal target trajectory that is set immediately before the determination in step 100 of whether the result of the determination is negative is executed.

In step 515, the steady gain Ksf and the differential gain Kdf for the target rudder angle δlkaf of the front wheels are calculated based on the vehicle speed V at the current time (referred to as a "criteria vehicle speed") in the same manner as that in step 360 mentioned above. Further, the steady gain Ksr and the differential gain Kdr for the target rudder angle δlkar of the rear wheels are calculated based on the vehicle speed V.

Steps 520 to 550 and steps 570 to 590 are executed in the same manner as those of steps 320 to 350 and steps 370 to 390 mentioned above except that the target trajectory is not a normal target trajectory but an interim target trajectory.

<Vehicle Deceleration Control Routine>

In step 610 in a vehicle deceleration control routine illustrated in FIG. 5, it is determined whether a target deceleration Gxbt of a vehicle in an interim target trajectory has been set already. Then, when the result of the determination is affirmative, the control proceeds to step 65, and when the result of the determination is negative, the control proceeds to step 620.

In step 620, an entire length Lp of the interim target trajectory is estimated. Then, the vehicle speed at that time, i.e., the criteria vehicle speed as the vehicle speed upon start of interim trajectory control, is given as "Vp", and the entire length Lp is divided by the criteria vehicle speed Vp, whereby an interim travel time Tp, which is a time necessary for the vehicle to travel throughout the entire length of the interim target trajectory, is calculated.

Figure 12:
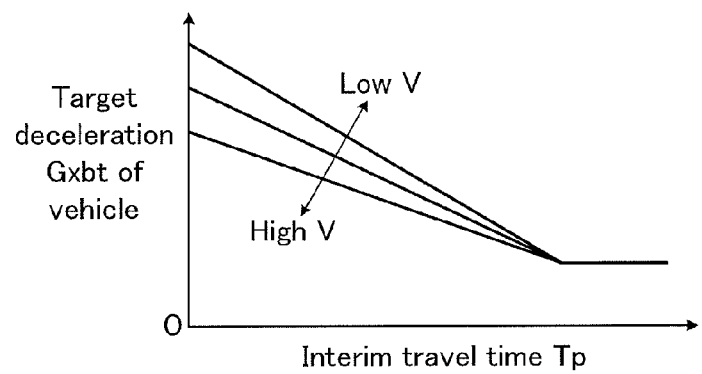
FIG. 12 is a map for calculating a target deceleration Gxbt of a vehicle in interim trajectory control based on an interim travel time Tp and a vehicle speed V.

In step 630, the target deceleration Gxbt of the vehicle in interim trajectory control is calculated based on the interim travel time Tp and the vehicle speed V according to a map illustrated in FIG. 12. As illustrated in FIG. 12, the target deceleration Gxbt is calculated in such a manner that the same is higher as the interim travel time Tp is shorter, and is lower as the vehicle speed V is higher.

In step 640, a total target braking force Fbtotal of the vehicle for causing the deceleration of the vehicle to coincide with the target deceleration Gxbt is calculated. Further, target braking forces Fbtfl, Fbtfr, Fbtrl, and Fbtrr of the left and right front wheels and left and right rear wheels are calculated based on the target braking force Fbtotal and a front wheel-rear wheel distribution ratio of the braking force.

In step 650, instruction signal for controlling an output of an engine (not illustrated in the drawings) so as to cause the output of the engine to become 0 is output to an engine control device (not illustrated in the drawings) so that the driving force of the vehicle should become 0.

In step 660, the control device 60 is controlled in such a manner that the braking forces for the left and right front wheels and the left and right rear wheels coincide with the corresponding target braking forces Fbtfl, Fbtfr, Fbtrl, and Fbtrr, respectively, whereby the vehicle speed is decreased so that the deceleration of the vehicle should coincide with the target deceleration Gxbt.

Though not illustrated in the drawings, the deceleration of the vehicle is gradually increased to the target deceleration Gxbt when interim trajectory control is started, whereby the decrease in the vehicle speed is gradually increased. In this case, it is preferable that the rate of increase of the target deceleration Gxbt is set variable according to the criteria vehicle speed Vp so that the target deceleration Gxbt is lower as the criteria vehicle speed Vp is higher.

Next, the following describes cruise control in the embodiment described above in details, as to various driving situations of the vehicle.

<A. When Vehicle Forward Information can be Normally Acquired>

An affirmative determination is made in step 100, and a negative determination is made in step 150. Then, in step 300, normal trajectory control is executed, according to the flowchart illustrated in FIG. 3. In other words, the rudder angles of the front and rear wheels are controlled so that the vehicle travels along a normal target trajectory.

In this case, vehicle deceleration control by step 600 is not executed, and hence, the vehicle speed is controlled based on an acceleration/deceleration operation by the driver, except for the cases of antiskid control, control of a traveling movement of the vehicle, and the like. Further, as step 200 is executed, a display indicating that normal trajectory control is being executed is displayed on the display device 82.

<B. When Vehicle Forward Information Cannot be Normally Acquired>

In steps 100 and 350, the result of the determination is negative. Then, interim trajectory control is executed in step 500, according to the flowchart illustrated in FIG. 4. In other words, the rudder angles of the front and rear wheels are controlled so that the vehicle travels along the interim target trajectory.

In this case, vehicle deceleration control according to step 600 is executed, whereby the deceleration of the vehicle is controlled so as to coincide with the target deceleration Gxbt unless an acceleration/deceleration operation is executed by the driver, and as a result, the vehicle speed is decreased. Further, as step 400 is executed, a display indicating that interim trajectory control is being executed is displayed on the display device 82.

Figure 13:
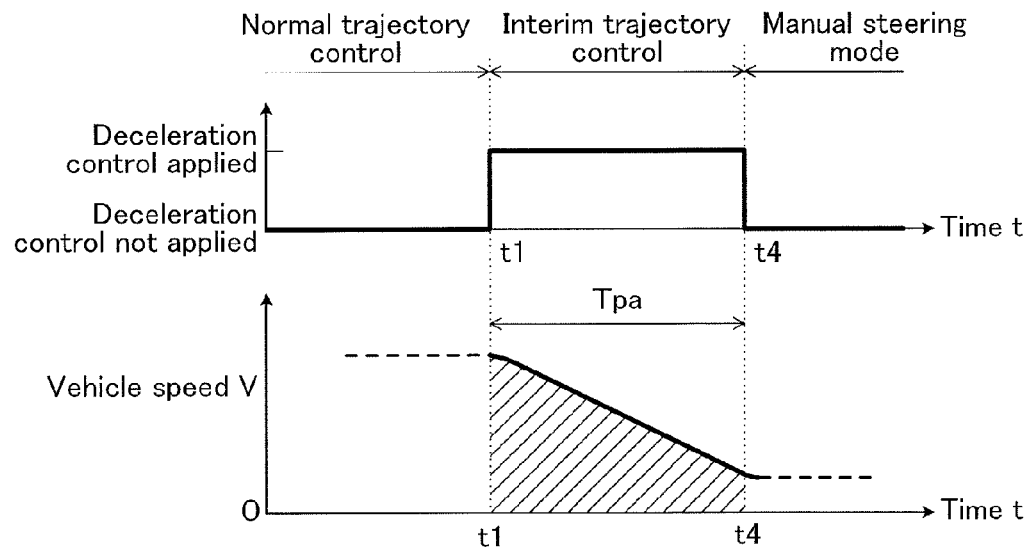
FIG. 13 illustrates an exemplary manner of changes in trajectory control, deceleration control, and a vehicle speed V regarding a case where information about a situation in front of a vehicle cannot be acquired normally during normal trajectory control in constant speed traveling.

For example, FIG. 13 illustrates an exemplary manner of changes in trajectory control, deceleration control, and a vehicle speed V regarding a case where information about a situation in front of a vehicle cannot be acquired normally during normal trajectory control in constant speed traveling. As illustrated in FIG. 13, it is assumed that vehicle forward information cannot be normally acquired at a time point t1 and the vehicle completes the traveling throughout the entire length of the interim target trajectory at a time point t4.

Trajectory control shifts from normal trajectory control to interim trajectory control at a time point t1, and interim trajectory control ends at the time point t4, whereby the steering mode shifts from the automatic steering mode to the manual steering mode. Interim trajectory control and deceleration control are executed from the time point t1 to the time point t4, more strictly, to a time point slightly after the time point t4, whereby the vehicle speed V gradually decreases from the time point t1 to the time point t4.

Figure 14:
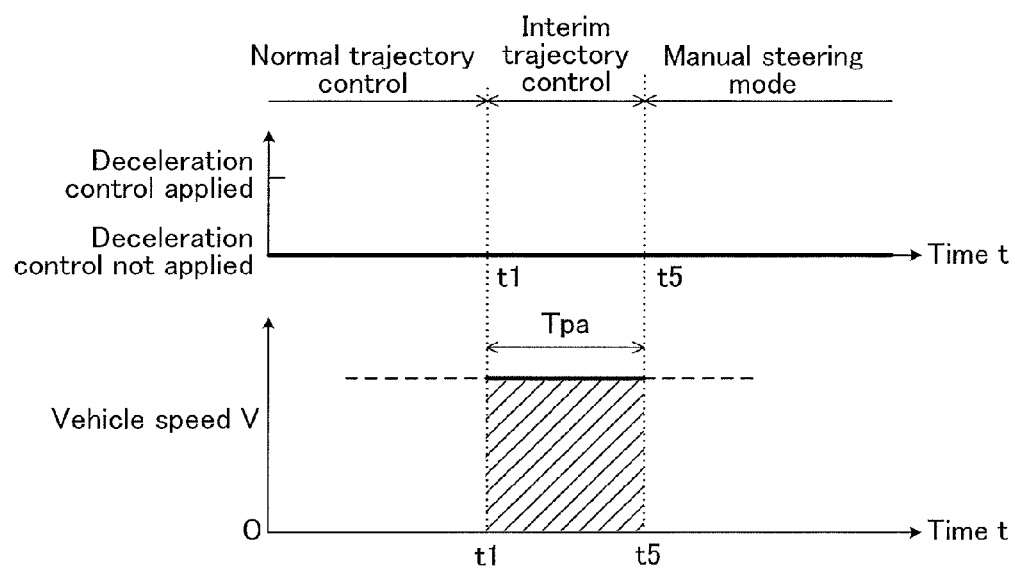
FIG. 14 illustrates an exemplary manner of changes in trajectory control, deceleration control, and a vehicle speed V in a cruise control device configured so that deceleration control is not executed during interim trajectory control, regarding a case where information about a situation in front of a vehicle cannot be acquired normally during normal trajectory control in constant speed traveling.

FIG. 14 illustrates an exemplary manner of changes in trajectory control, deceleration control, and a vehicle speed V in a cruise control device configured so that deceleration control is not executed during interim trajectory control, regarding a case where information about a situation in front of a vehicle cannot be acquired normally during normal trajectory control in constant speed traveling.

As illustrated in FIG. 14, in the case where it is assumed that interim trajectory control is executed from the time point t1 to the time point t5, deceleration control is not executed, either, from the time point t1 to the time point t5, and hence, the vehicle speed V does not change. The vehicle therefore completes the traveling along the interim target trajectory earlier than in the case of the embodiment, and hence, the time point t5 is closer to the time point t1 as compared with the time point t4 when interim trajectory control ends in the case of the embodiment. Duration time Tpa of interim trajectory control is therefore shorter than that in the case of the embodiment.

It should be noted that areas of hatched regions in FIGS. 13 and 14 indicate distances for which the vehicle travels during interim trajectory control, that is, the entire length of the interim target trajectory. These areas are therefore equal to each other.

As is clear from comparison between FIGS. 13 and 14, according to the embodiment, the duration time Tpa of interim trajectory control can be elongated as compared with the case where deceleration control is not performed during interim trajectory control. Therefore, a time for causing the driver to recognize that trajectory control in the automatic steering mode ends can be elongated, and at the same time, the driver can make preparation in good time for shift to the manual steering mode.

Further, as the vehicle speed V is decreased, a risk that a traveling behavior of the vehicle would change rapidly when the steering mode shifts from the automatic steering mode to the manual steering mode can be surely reduced, as compared with the case where the vehicle speed is not decreased. Therefore, the stability of the vehicle when trajectory control in the automatic steering mode ends can be improved as compared with the conventional case.

Still further, even in the case where deceleration control is executed during interim trajectory control, if the target deceleration Gxbt is a constant value, the duration time Tpa of interim trajectory control is shorter as the vehicle speed V is higher, and is shorter as the length of the interim target trajectory is shorter. In a situation where the vehicle speed V is high and the length of the interim target trajectory is short, therefore, the duration time Tpa cannot be elongated sufficiently. By contraries, in a situation where the vehicle speed V is low and the length of the interim target trajectory is long, the duration time Tpa is excessively elongated.

According to the embodiment, the entire length Lp of the interim target trajectory is estimated in step 620. The vehicle speed at that time is given as a criteria vehicle speed Vp, and the entire length Lp is divided by the criteria vehicle speed Vp, whereby a time necessary for the vehicle to travel throughout the entire length of the interim target trajectory, that is, the interim travel time Tp, is calculated. Then, in step 630, the target deceleration Gxbt is calculated in such a manner that the target deceleration Gxbt of the vehicle is higher as the interim travel time Tp is shorter, based on the interim travel time Tp and the vehicle speed V according to the map illustrated in FIG. 12.

As a result, the duration time Tpa can be elongated sufficiently in a situation where the vehicle speed V is high or a situation where the length of the interim target trajectory is short, and by contraries, the duration time Tpa can be prevented from becoming excessively long in a situation where the vehicle speed V is low or a situation where the length of the interim target trajectory is long. In other words, the duration time Tpa can be elongated appropriately, irrespective of the vehicle speed V or the length of the interim target trajectory.

Still further, as is clear from comparison between FIGS. 3 and 4, the gains Ksf, Kdf, Ksr, and Kdr are calculated based on the vehicle speed V when interim trajectory control is started, that is, based on the criteria vehicle speed Vp, and hence, the gains are not updated even when the vehicle speed changes. Therefore, even when the vehicle speed is gradually decreased by deceleration control executed during interim trajectory control, the steady gain Ksf for the target rudder angle δlkaf of the front wheels does not increase, and the antiphase degree of the steady gain Ksr for the target rudder angle δlkar of the rear wheels does not increase, either.

This makes it possible to surely prevent the gains of the rudder angles of the front and rear wheels with respect to the target lateral acceleration Gyt during interim trajectory control from excessively increasing toward such a side as to accelerate the turning of the vehicle as the vehicle speed decreases due to deceleration control. Therefore, as compared with the case where the gains Ksf, Kdf, Ksr, and Kdr are set variable according to the vehicle speed V even during interim trajectory control, the risk can be surely reduced that traveling behaviors of the vehicle would deteriorate due to excessive increases in the gains of the rudder angles of the front and rear wheels with respect to the target lateral acceleration Gyt.

Further, when the vehicle is automatically decelerated by deceleration control executed during interim trajectory control, the occupant of the vehicle feels discomfort in some cases. Then, the discomfort is more remarkable as the vehicle speed V is higher and the deceleration is higher.

According to the embodiment, the target deceleration Gxbt of the vehicle is calculated in step 630 in such a manner that the target deceleration Gxbt is lower as the vehicle speed V is higher. Therefore, as compared with the case where the target deceleration Gxbt of the vehicle is calculated based on the interim travel time Tp alone without the vehicle speed V being taken into consideration, the discomfort that the occupant feels due to the deceleration of the vehicle when interim trajectory control is started in a situation where the vehicle speed V is high can be reduced.

Further, according to the embodiment, when the deceleration of the vehicle by deceleration control is started, the deceleration of the vehicle is gradually increased so as to coincide with the target deceleration Gxbt, and when the deceleration of the vehicle by deceleration control is ended, the deceleration of the vehicle is gradually decreased so as to become 0. Therefore, as compared with the case where the deceleration of the vehicle is controlled so as to immediately come to coincide with the target deceleration Gxbt when deceleration control is started, the discomfort that the occupant feels due to the deceleration of the vehicle upon the start of interim trajectory control can be reduced. Further, as compared with the case where the deceleration of the vehicle is controlled so as to immediately become 0 upon the end of deceleration control, the discomfort that the occupant feels due to the abrupt cancellation of the deceleration of the vehicle upon the end of interim trajectory control can be reduced.

In particular, in the case where the rate of increase of the target deceleration Gxbt is set variable according to the criteria vehicle speed Vp so as to be lower as the criteria vehicle speed Vp is higher, the discomfort that the occupant feels can be further effectively reduced, as compared with the case where the rate of increase of the target deceleration Gxbt is constant irrespective of the criteria vehicle speed Vp.

<C. When Condition for Ending is Satisfied During Interim Trajectory Control>
<C1. When Conditions for Ending are Conditions for Ending Interim Trajectory Control>

This case is the case where the vehicle has traveled to the end point of the interim target trajectory, and a negative determination is made in step 100, while an affirmative determination is made in step 350. Then, interim trajectory control ends in step 750, whereby the steering mode shifts from the automatic steering mode to the manual steering mode. In step 800, vehicle deceleration control based on the target deceleration ends, whereby the vehicle speed stops decreasing.

It should be noted that it is at the time point t4 that a negative determination is made in step 100 and an affirmative determination is made in step 350, in the driving situation of the vehicle illustrated in FIG. 13.

<C2. When Condition for Ending is Driving Operation by Driver>

This case is a case where at least any one of a steering operation, a deceleration operation, and an accelerate operation is executed by a driver before the vehicle travels to the end point of an interim target trajectory, and in this case as well, a negative determination is made step 100, while an affirmative determination is made in step 350. Then, in step 750, interim trajectory control ends and the steering mode shifts from the automatic steering mode to the manual steering mode, and in step 800, deceleration control of the vehicle based on the target deceleration ends, whereby the vehicle speed stops decreasing.

Figure 15:
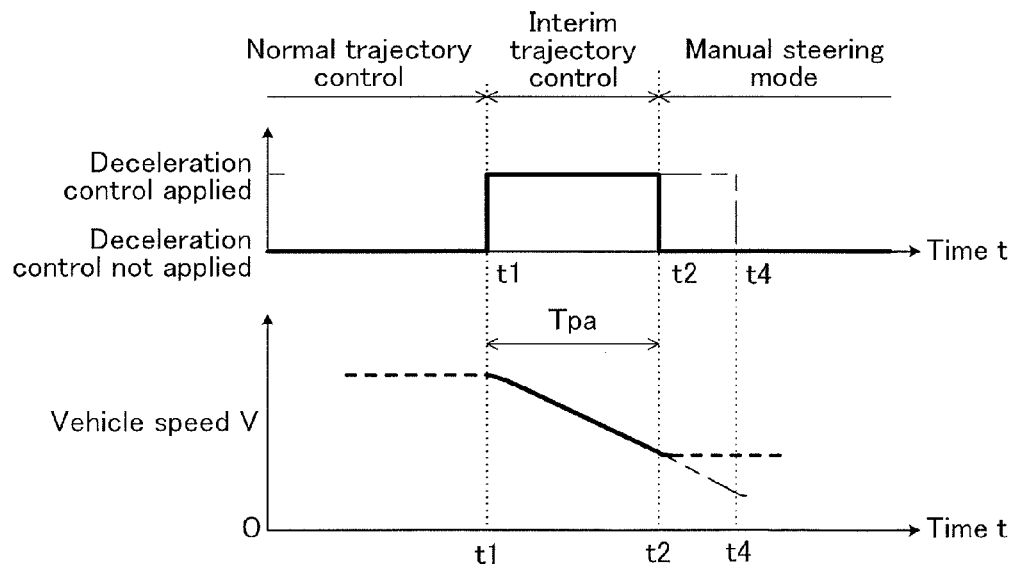
FIG. 15 illustrates an exemplary manner of changes in trajectory control, deceleration control, and a vehicle speed V, regarding a case where at least one of a steering operation, a deceleration operation, and an accelerate operation is executed by a driver before a vehicle travels to an end point of an interim target trajectory.

For example, as illustrated in FIG. 15, at a time point t2 that is before the time point t4 when the vehicle travels to the end point of the interim target trajectory, interim trajectory control ends and the steering mode shifts from the automatic steering mode to the manual steering mode, and at the same time, vehicle deceleration control based on the target deceleration ends.

Therefore, when any one of the steering operation, the deceleration operation, and the accelerate operation is executed by the driver during interim trajectory control, interim trajectory control can be stopped at this stage, and transition can be made to a situation where the vehicle is caused to travel according to a driving operation by the driver. In other words, priority can be placed on the driver's intention to drive, rather than the continuation of interim trajectory control.

In cases, C1 and C2 mentioned above, notification information indicating that interim trajectory control ends and the steering mode shifts from the automatic steering mode to the manual steering mode is presented by the display device 82 to the occupant of the vehicle in step 700. This allows the occupant to recognize that interim trajectory control ends and the steering mode shifts from the automatic steering mode to the manual steering mode.

<D. When Normally Acquiring Vehicle Forward Information Becomes Possible>

In steps 100 and 150, affirmative determinations are made. Then, in step 900, interim trajectory control is ended, and trajectory control returns to normal trajectory control. Further, in step 950, vehicle deceleration control based on the target deceleration is ended, which causes the vehicle speed to stop decreasing.

Therefore, when normally acquiring vehicle forward information becomes possible in a situation where interim trajectory control is being executed, unnecessary continuation of interim trajectory control can be prevented, and trajectory control can be caused to return to normal trajectory control.

In this case as well, in step 850, notification information indicating that interim trajectory control ends and trajectory control returns to normal trajectory control is presented by the display device 82 to the occupant of the vehicle. The occupant is therefore allowed to recognize that interim trajectory control ends and trajectory control returns to normal trajectory control.

In the foregoing description, the present invention is described in detail regarding a particular embodiment, but it will be evident to those skilled in the art that the present invention is not limited to the above-described embodiment, and other various embodiments should be possible within the scope of the present invention.

For example, in the embodiment mentioned above, the target deceleration Gxbt is calculated from the map illustrated in FIG. 12 so as to be higher as the interim travel time Tp is shorter and to be lower as the vehicle speed V is higher. The configuration, however, may be modified so that the target deceleration Gxbt is higher as the interim travel time Tp is shorter based on the interim travel time Tp alone.

Figure 16:
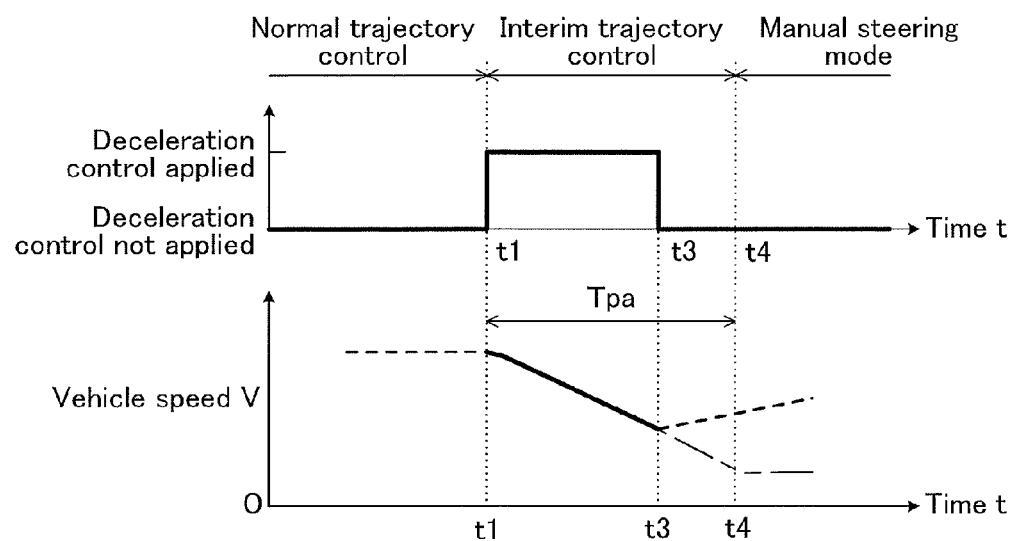
FIG. 16 illustrates an exemplary manner of changes in trajectory control, deceleration control, and a vehicle speed V, regarding a case where an accelerate operation is executed by a driver before a vehicle travels to an end point of an interim target trajectory in a modified example.

Further, in the embodiment mentioned above, when any one of a steering operation, a deceleration operation, and an accelerate operation is executed by the driver during interim trajectory control, interim trajectory control is stopped at this stage, and vehicle deceleration control based on the target deceleration ends. The configuration, however, may be modified as follows: in the case where the operation by the driver is a deceleration operation or an accelerate operation, vehicle deceleration control is stopped at this stage, but interim trajectory control is continued thereafter for a while, for example, until another condition for ending is satisfied. FIG. 16 illustrates a case where an accelerate operation is executed by the driver at a time point t3, and vehicle deceleration control ends at the time point t3, but interim trajectory control is continued to the time point t4 when the vehicle arrives at the end point of the interim target trajectory.

Further, in the embodiment mentioned above, when interim trajectory control ends, notification information indicating that interim trajectory control ends is presented by the display device 82 to the occupant of the vehicle at a time point when interim trajectory control ends, irrespective of factors for the end. The configuration, however, may be modified so that in the case where the arrival of the vehicle to the end point of the interim target trajectory causes interim trajectory control to end, notification information indicating that interim trajectory control is to end is presented prior to the end of interim trajectory control.

Further, in the embodiment mentioned above, a curvature R (reciprocal of radius) of the target trajectory, a deviation Y of the vehicle in the lateral direction with respect to the target trajectory, and a deviation φ of a yaw angle are calculated, target rudder angles of the front and rear wheels are calculated based on these, and the rudder angles of the front and rear wheels are controlled so as to coincide with the target rudder angles. It is, however, sufficient that cruise control causes the vehicle to travel along a traveling road by steering the steerable wheels, and the configuration may be achieved in an arbitrary manner, for example, by lane deviation prevention for controlling a rudder angle of the steerable wheels so that the vehicle should not deviate from a lane.

Further, in the embodiment mentioned above, the target lateral acceleration Gyt of the vehicle is calculated as a target state quantity of the vehicle, based on a curvature R of the target trajectory, a deviation Y of the vehicle in the lateral direction with respect to the target trajectory, and a deviation φ of a yaw angle, and the target rudder angles of the front and rear wheels are calculated based on the target lateral acceleration Gyt. However, the target state quantity of the vehicle may be a target yaw rate of the vehicle, a target yaw moment of the vehicle, or a target lateral force of the vehicle.

Further, in the embodiment mentioned above, the configuration may be such that the rudder angles of the front and rear wheels are controlled, but the control of the rudder angle of the rear wheels does not have to be performed. The rudder angle of the front wheels is controlled by the rudder angle varying device 14 rotating and driving the lower steering shaft 30 relatively with respect to the upper steering shaft 28. The rudder angle of the front wheels, however, may be controlled by a rudder angle varying device having an arbitrary configuration, for example, a steer-by-wire type steering device.

The invention claimed is:

1. A vehicle cruise control device that acquires information of surroundings of a vehicle, sets a traveling road that the vehicle is to travel from then based on the acquired information of the surroundings, and executes cruise control for causing the vehicle to travel along the set traveling road, wherein when normally acquiring information of surroundings becomes impossible, the vehicle cruise control device executes interim cruise control for causing the vehicle to travel along the set traveling road, while causing a vehicle speed to decrease, wherein the vehicle cruise control device is configured to:
estimate a total distance of the set traveling road along which the vehicle is to travel after the interim cruise control starts,
estimate an interim travel time from when the interim cruise control starts until the vehicle completes the traveling along the set traveling road by dividing the total distance by a vehicle speed at that time,
set a target deceleration variably according to the interim travel time so that, when the interim travel time is short, the target deceleration is higher as compared to where the interim travel time is long, and
decelerate the vehicle so that a deceleration of the vehicle coincides with the target deceleration.

2. The vehicle cruise control device according to claim 1, wherein, using the vehicle speed upon start of the interim cruise control as a criteria vehicle speed, the cruise control device is configured to set the target deceleration variably according to the criteria vehicle speed such that when the criteria vehicle speed is high, the target deceleration is lower as compared to where the criteria vehicle speed is low.

3. The vehicle cruise control device according to claim 1 comprising a rudder angle varying device configured to change a rudder angle of a wheel, wherein the cruise control device is configured to execute the cruise control and the interim cruise control by calculating a target state quantity of the vehicle for causing the vehicle to travel along the set traveling road, calculate a target rudder angle of the wheel based on the target state quantity, and control the rudder angle varying device in such a manner that the rudder angle of the wheel coincides with the target rudder angle, and
wherein the cruise control device is configured to set a gain of the target rudder angle of the wheel with respect to the target state quantity variably according to the vehicle speed during the cruise control, and to not set the gain variably according to the vehicle speed during the interim cruise control.

4. The vehicle cruise control device according to claim 1, wherein, when the vehicle completes the traveling along the set traveling road, the cruise control device is configured to end the interim cruise control and the deceleration of the vehicle.

5. The vehicle cruise control device according to claim 1, wherein, when any one of a steering operation, a deceleration operation, and an accelerate operation is executed by the driver during the execution of the interim cruise control, the cruise control device is configured to end the interim cruise control and the deceleration of the vehicle.

6. The vehicle cruise control device according to claim 1, wherein, when normally acquiring information of surroundings of the vehicle becomes possible during the interim cruise control, the cruise control device is configured to end the interim cruise control and the deceleration of the vehicle and resume the cruise control.

* * * * *